US012794726B2

United States Patent
(12) United States Patent
Bailey et al.

(10) Patent No.: US 12,794,726 B2
(45) Date of Patent: Nov. 10, 2026

(54) ANALYZING OPT-IN AUDIO INPUT TO IMPROVE IN-PERSON EVENT COMPREHENSION AND PREPARATION

(71) Applicant: International Business Machines Corporation, Armonk, NY (US)

(72) Inventors: Logan Bailey, Atlanta, GA (US); Jacob Ryan Jepperson, St. Paul, MN (US); Jeremy R. Fox, Georgetown, TX (US); Zachary Augustus Silverstein, Georgetown, TX (US); Melanie Dauber, Oceanside, NY (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 19/007,781

(22) Filed: Jan. 2, 2025

(65) Prior Publication Data

US 2026/0189422 A1 Jul. 2, 2026

(51) Int. Cl.
*H04L 12/18* (2006.01)
*G10L 15/06* (2013.01)
(Continued)

(52) U.S. Cl.
CPC ........ *H04L 12/1831* (2013.01); *G10L 15/063* (2013.01); *G10L 21/0208* (2013.01); *G16Y 40/20* (2020.01)

(58) Field of Classification Search
CPC ... H04L 12/1831; G16Y 40/20; G19L 15/063; G10L 21/0208
(Continued)

(56) References Cited

U.S. PATENT DOCUMENTS 8,937,888 B2 1/2015 Foo et al.
9,591,260 B1 3/2017 Inkpen Quinn et al.
(Continued)

FOREIGN PATENT DOCUMENTS

CN 111883123 A 11/2020

OTHER PUBLICATIONS

"Capture AI's full potential to drive growth, productivity and competitive advantage", IBM, retrieved from web https://www.ibm.com/events/think, Feb. 27, 2025, 5 pages.
(Continued)

*Primary Examiner* — Zi Ye
(74) *Attorney, Agent, or Firm* — Yee & Associates, P.C.

(57) ABSTRACT

Managing opt-in audio input is provided. A set of insights corresponding to an upcoming in-person event is generated using a set of machine learning models based on keyword frequency, predicted event attendee sentiment, predicted most discussed event topics, predicted frequently asked event questions, and predicted event outcome. An event summary for the upcoming in-person event is generated using the set of insights corresponding to the upcoming in-person event that was generated based on the keyword frequency, the predicted event attendee sentiment, the predicted most discussed event topics, the predicted frequently asked event questions, and the predicted event outcome. The event summary for the upcoming in-person event is distributed using a distribution channel to an event organizer and a plurality of event attendees who will be physically present at the in-person event.

20 Claims, 4 Drawing Sheets

(51) Int. Cl.
*G10L 21/0208* (2013.01)
*G16Y 40/20* (2020.01)

(58) Field of Classification Search
USPC .......................................................... 709/204
See application file for complete search history.

(56) References Cited

U.S. PATENT DOCUMENTS

| | | | |
|---|---|---|---|
| 10,726,270 | B2 | 7/2020 | Kim |
| 10,987,596 | B2 | 4/2021 | Evans et al. |
| 11,095,468 | B1 * | 8/2021 | Pandey ............... H04L 12/1831 |
| 11,282,532 | B1 | 3/2022 | Slotznick |
| 11,546,552 | B1 | 1/2023 | Gupta et al. |
| 11,736,660 | B2 | 8/2023 | Smith et al. |
| 2016/0309205 | A1 | 10/2016 | Cowger |
| 2019/0163500 | A1 * | 5/2019 | Daianu ................... G06F 9/453 |
| 2020/0118233 | A1 | 4/2020 | Deluca et al. |
| 2022/0214933 | A1 | 7/2022 | Aravabhumi et al. |
| 2024/0040067 | A1 | 2/2024 | Apurvi |
| 2024/0114177 | A1 | 4/2024 | Pollet |
| 2024/0155016 | A1 | 5/2024 | Previtali |
| 2025/0272330 | A1 * | 8/2025 | Au ................... G06V 30/19173 |
| 2025/0343772 | A1 * | 11/2025 | Blackadder ........... G06F 40/166 |

OTHER PUBLICATIONS

"IBM TechXchange 2025", IBM, retrieved from web https://www.ibm.com/community/ibm-techxchange-conference/, dated Feb. 27, 2025, 3 pages.

"IoT and IBM Cloud® are creating opportunities for growth", IBM, retrieved from web https://www.ibm.com/watsonx, dated Feb. 27, 2025, 4 pages.

"Realize the promise of AI with watsonx" IBM, retrieved from web https://www.ibm.com/watsonx, dated Feb. 27, 2025, 7 pages.

Flores-Saviaga et al., "Audience and Streamer Participation at Scale on Twitch", arXiv:2012.00215v1, Dec. 1, 2020, 11 pages.

Hamilton et al., "Collaborative Live Media Curation : Shared Context For Participation In Online Learning", https://dl.acm.org/doi/10.1145/3173574.3174129, Apr. 21, 2018, 14 pages.

Hamilton et al., "Rivulet: Exploring Participation in Live Events through Multi-Stream Experiences", https://doi.org/10.1145/2932206.2932211, Jun. 17, 2016, 12 pages.

Mao et al., "Multi-User Chat Assistant (MUCA): a Framework Using LLMs to Facilitate Group Conversations", arXiv:2401.04883v3, Feb. 16, 2024, 29 pages.

Vu et al., "GPTVoiceTasker: Advancing Multi-step Mobile Task Efficiency Through Dynamic Interface Exploration and Learning", arXiv:2401.14268v3, Aug. 14, 2024, 17 pages.

* cited by examiner

ANALYZING OPT-IN AUDIO INPUT TO IMPROVE IN-PERSON EVENT COMPREHENSION AND PREPARATION

BACKGROUND

The disclosure relates generally to in-person events and more specifically to managing in-person events.

In-person events are just that, where event attendees gather at a physical location. In-person events are all about human connection. They are a chance for people to come together face-to-face, interact, network, learn, and share experiences. Service provider/customer conferences, sales kickoffs, workshops, seminars, and onboarding are common types of in-person events.

While technology has made remote interactions more accessible, nothing compares to event attendees being in the same physical location. Attending in-person events creates opportunities for impact and interaction that are not possible virtually. For example, an event attendee can see demonstrations, ask questions, and engage with speakers and other attendees individually.

SUMMARY

According to one illustrative embodiment, a computer-implemented method is provided. The computer-implemented method, using a set of machine learning models, generates a set of insights corresponding to an upcoming in-person event based on keyword frequency, predicted event attendee sentiment, predicted most discussed event topics, predicted frequently asked event questions, and predicted event outcome. The computer-implemented method generates an event summary for the upcoming in-person event using the set of insights corresponding to the upcoming in-person event that was generated based on the keyword frequency, the predicted event attendee sentiment, the predicted most discussed event topics, the predicted frequently asked event questions, and the predicted event outcome. The computer-implemented method, using a distribution channel, distributes the event summary for the upcoming in-person event to an event organizer and a plurality of event attendees who will be physically present at the in-person event. According to other illustrative embodiments, a computer system and computer program product are provided.

DETAILED DESCRIPTION

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A CPP embodiment is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
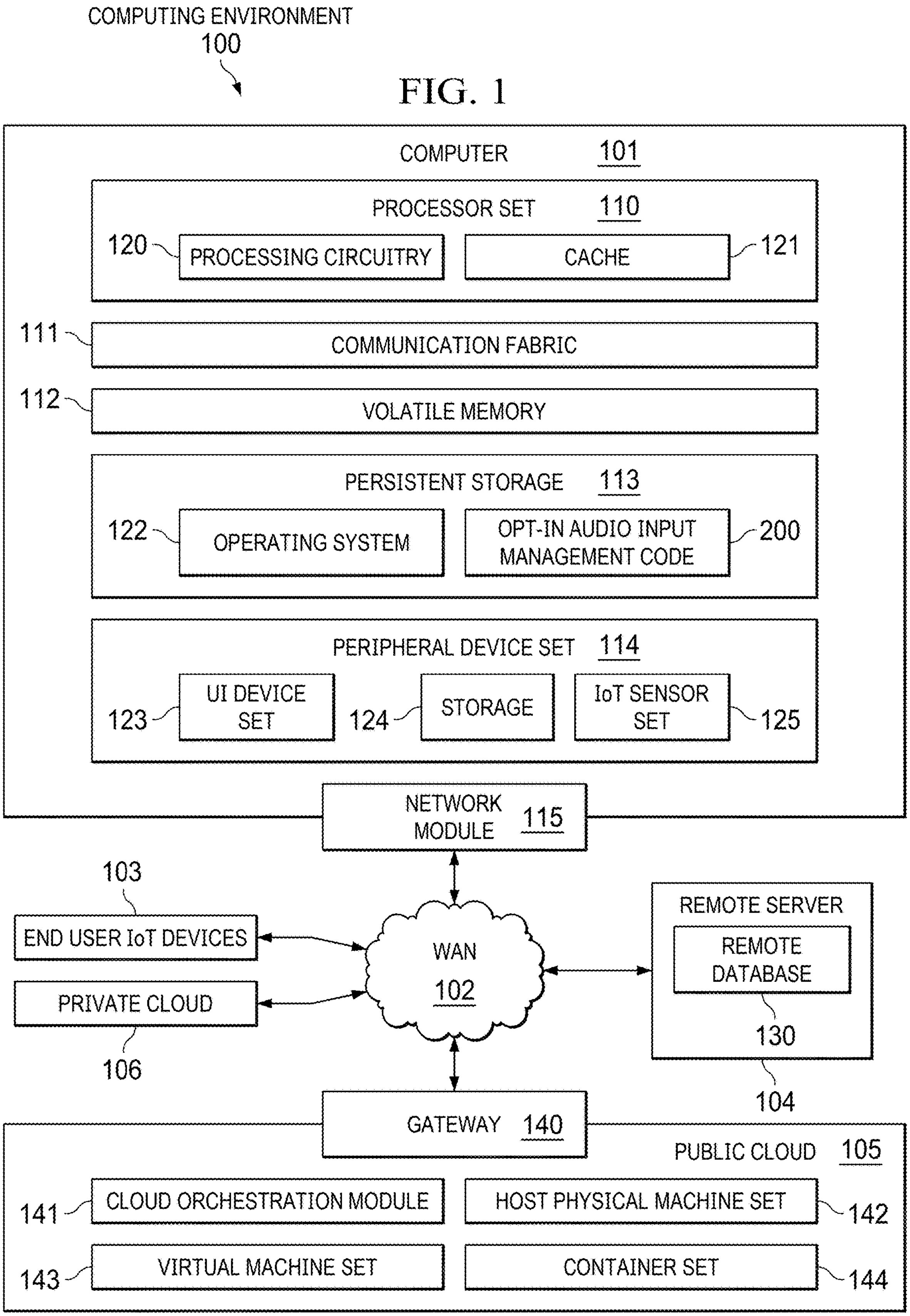
FIG. 1 is a pictorial representation of a computing environment in which illustrative embodiments may be implemented.
Figure 2:
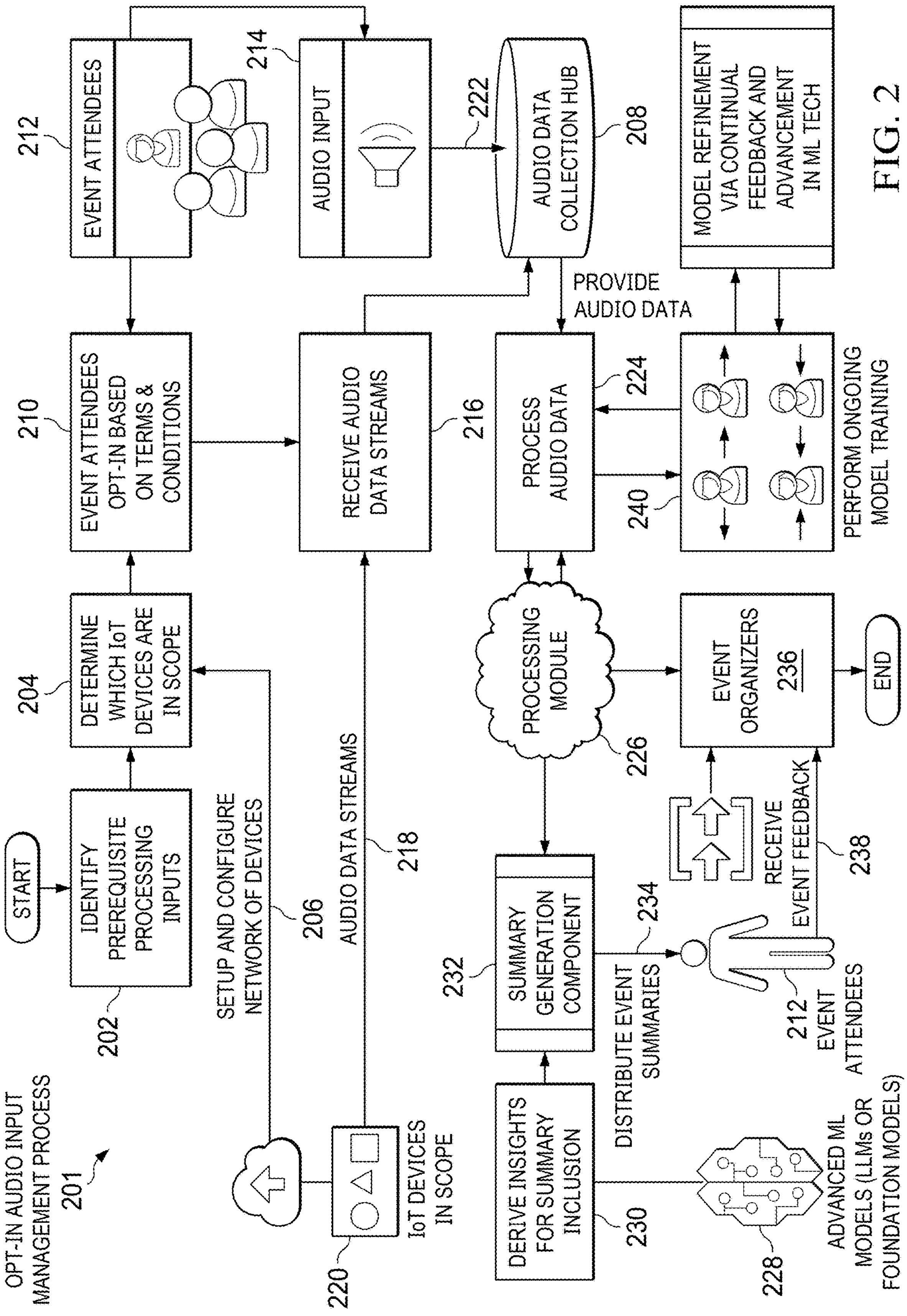
FIG. 2 is a diagram illustrating an example of an opt-in audio input management process in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as opt-in audio input management code 200.

For example, opt-in audio input management code 200 collects audio input from opted-in event attendees, converts event attendee speech to text, and analyzes the text using a set of machine learning models to interpret, for example, event attendee context, experience, sentiment, and feedback corresponding to a particular in-person event. An event attendee is anyone who is planning on being present at a physical location during an in-person event. Opt-in audio input management code 200 inputs the text into a set of large language models or foundation models to generate comprehensive summaries of the in-person event that include, for example, predicted most discussed topics during the event, predicted frequently asked event questions, predicted event outcome, items for event attendees to consider, how best for event attendees to prepare for the in-person event, and the like. Opt-in audio input management code 200 distributes the generated comprehensive summaries to upcoming event attendees so that the event attendees can better understand the in-person event and what to expect at the in-person event. Opt-in audio input management code 200 also distributes the generated comprehensive summaries to event organizers so that the event organizers can improve in-person events by tailoring the in-person events to predicted needs of event attendees.

In addition to opt-in audio input management code 200, computing environment 100 includes, for example, computer 101, wide area network (WAN) 102, end user Internet of Things (IoT) devices 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and opt-in audio input management code 200, as identified above), peripheral device set 114 (including user interface (UI) device set 123, storage 124, and IoT sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in opt-in audio input management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices.

Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user IoT devices 103 represent a plurality of IoT devices that are used and controlled by end users (e.g., attendees of in-person events). In some embodiments, end user IoT devices 103 may include, for example, smart phones, handheld computers, laptop computers, and the like. In addition, end user IoT devices 103 are designed to capture audio input corresponding to the end users. End user IoT devices 103 typically receive helpful and useful data from the operations of computer 101. For example, in a hypothetical case where computer 101 is designed to provide comprehensive event summaries of in-person events to the end users, these comprehensive event summaries would typically be communicated from network module 115 of computer 101 through WAN 102 to end user IoT devices 103. In this way, end user IoT devices 103 can display, or otherwise present, the comprehensive event summaries to the end users.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide comprehensive event summaries of in-person events based on opted-in audio data from end users, then this opted-in audio data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Illustrative embodiments take into account and address a problem across numerous industries that rely on organizing in-person events (i.e., conferences, seminars, or any other in-person event gatherings) at physical spaces or venues. The current lack of comprehensive information about these in-person events presents significant challenges and uncertainties for both event organizers and event attendees. Traditional event descriptions often fall short in providing a comprehensive understanding of what to expect at the in-person event, leaving event attendees unprepared and potentially leading to missed opportunities for event organizers.

For example, deriving inadequate insights corresponding to in-person events extend beyond individual event attendees, it affects event organizers, such as businesses, enterprises, institutions, organizations, agencies, and the like, where in-person events play a needed role. Event organizers strive to ensure the success of their in-person events, but the lack of accurate, real-time data regarding event attendee interests and expectations hamper an event organizer's ability to make informed decisions. In addition, the absence of a mechanism to understand event attendees' sentiments and concerns also restricts the event organizer's ability to proactively address event attendee needs to improve the in-person event experience.

To overcome these challenges, a new solution is needed that uses IoT and audio input technologies. By utilizing an opt-in stream of audio input from in-person event attendees, illustrative embodiments can derive valuable insights from these future event attendees. Further, illustrative embodiments can utilize the derived insights from analyzing the collected audio input to train advanced machine learning models, such as large language models, foundation models, and the like, to generate comprehensive event summaries corresponding to respective in-person events. These comprehensive event summaries can provide valuable information to event attendees, such as the predicted most discussed event topics, most frequently asked event questions, expected event outcome, letting event attendees know what to expect, and providing recommendations on how event attendees can best prepare for the in-person event.

Illustrative embodiments utilize the opted-in stream of audio input from event attendees to enhance the understanding of an in-person event, provide insights on event expectations, and facilitate better event organizer preparation. Illustrative embodiments utilize a plurality of IoT devices, which capture and transmit real time streaming audio data from event attendees who voluntarily opt-in to share the audio input from their IoT devices (e.g., smart phones, tablet computers, laptop computers, and the like). Illustrative embodiments set up and configure a network of these IoT devices corresponding to the opted-in event attendees.

Illustrative embodiments utilize a processing module to analyze the captured opted-in audio data using advanced machine learning models, such as, for example, large language models, foundation models, and the like, to derive meaningful insights corresponding to the in-person event. Illustrative embodiments can use these derived event insights to generate the comprehensive event summaries, which encompass popular event topics, frequently asked event questions, and anticipated event outcomes. Event attendees can consume the comprehensive event summaries to better prepare for the in-person event and optimize their experience.

Furthermore, illustrative embodiments can translate different audio inputs for multilingual events. For example, illustrative embodiments can use multilingual models to generate different event summaries in different languages.

In addition, illustrative embodiments utilize the captured opted-in audio data to continually train the advanced machine learning models to increase the predictive accuracy of the advanced machine learning models and relevance of generated comprehensive event summaries over time. As a result, any in-person event can utilize the opted-in audio inputs of illustrative embodiments to gain valuable insights into event attendees' preferences and interests, and any predicted hot topics to be discussed during the event. Thus, illustrative embodiments can significantly improve in-person event attendance, participation, and productivity.

Thus, illustrative embodiments provide one or more technical solutions that overcome a technical problem with an inability of existing solutions to automatically generate comprehensive event summaries of in-person events based on receiving real time audio input from opted-in event attendees. As a result, these one or more technical solutions provide a technical effect and practical application in the field of audio processing.

With reference now to FIG. 2, a diagram illustrating an example of an opt-in audio input management process is depicted in accordance with an illustrative embodiment. Opt-in audio input management process 201 may be implemented in a computing environment, such as computing environment 100 in FIG. 1.

In this example, opt-in audio input management process 201 starts at 202 where a computer, such as computer 101 in FIG. 1, identifies perquisite processing inputs. The perquisite processing inputs include, for example, opted-in audio data streams from event attendees, audio data inputs from IoT devices, event-specific data (e.g., event agenda, event attendee profiles, and the like), machine learning model training data if applicable, and event attendee feedback and preferences to improve comprehensive event summaries, recurring in-person events, and machine learning model training.

At 204, the computer determine which IoT devices are in scope (i.e., IoT device inclusion and configuration). For example, at 206, the computer sets up and configures a network of IoT devices, such as microphones, voice recorders, cellular phones, laptop computers, handheld computers, and the like, capable of capturing audio input. The computer configures the IoT devices to connect to a central audio data collection hub, such as audio data collection hub 208. The computer also ensures that the IoT devices set up in the event space are able to capture high-quality audio in the event space from opted-in event attendees. For example, the computer can install an event application on IoT devices of opted-in event attendees for audio capture.

At 210, event attendees 212 opt-in to audio data sharing based on usage policy terms and conditions. The computer provides an opt-in mechanism for event attendees 212 to voluntarily agree to share their audio input 214 to enhance the in-person event. For example, the computer provides a user-friendly process for event attendees 212 to provide their consent for audio data sharing via, for example, a mobile event application, online platform, or the like. Further, the computer clearly communicates the purpose and benefits of sharing audio input 214 to encourage event attendees 212 to opt-in to the audio input sharing.

At 216, the computer receives audio data streams 218 from IoT devices in scope 220. The computer places audio data streams 218 in audio data collection hub 208. At 222, the computer filters out or removes audio input from non-opted-in event attendees. The computer establishes a secure audio data collection mechanism to receive audio data streams 218 from IoT devices in scope 220. Furthermore, the computer implements a set of security policies to ensure the security of collected audio input 214. Moreover, the computer configures a secure transmission protocol to transmit audio data streams 218 from IoT devices in scope 220 to audio data collection hub 208.

At 224, the computer processes the audio data stored in audio data collection hub 208 using processing module 226. Processing module 226 utilizes advanced machine learning models 228 to analyze the collected audio data. Advanced machine learning models 228 include, for example, a set of large language models, foundation models, or the like. It should be noted that processing module 226 implements appropriate audio infusion and processing techniques, such as noise reduction, speech recognition, and the like, to increase the accuracy of the audio data analysis.

At 230, processing module 226 derives or generates insights for event summary inclusion based on analyzing the audio data using, for example, the natural language understanding and processing capabilities of advanced machine learning models 228. For example, processing module 226 identifies keyword frequency, event attendee sentiment, predicted most discussed event topics, frequently asked event questions, and expected event outcome to derive the insights.

The computer utilizes summary generation component 232 to generate the comprehensive event summaries based on the generated insights. Summary generation component 232 utilizes the identified keyword frequency, event attendee sentiment, predicted most discussed event topics, frequently asked event questions, and expected event outcome to develop a comprehensive summary for a particular in-person event. In addition, summary generation component 232 can customize the summary generation process to meet the specific needs of different event types and industries. Moreover, summary generation component 232 can customize event summaries for event attendees 212 based on event attendee profiles.

At 234, the computer distributes the comprehensive event summaries to event attendees 212 and event organizers 236 via an established distribution channel. For example, the computer can provide a user-friendly interface, such as a web portal or mobile event application, for event attendees 212 and event organizers 236 to access the comprehensive summary of the in-person event. Event organizers 236 can utilize the comprehensive summary of the in-person event to enhance event planning, decision-making, and overall event management. Further, at 238, event organizers 236 can receive event feedback from event attendees 212 during and after the in-person event.

Also, at 240, the computer performs ongoing model training of advanced machine learning models 228 for model refinement via continual event attendee feedback and advancements in machine learning model technology. For example, the computer implements a feedback loop to incorporate event attendee feedback to increase machine learning model predictive accuracy and relevance of event summaries over time. In addition, the computer utilizes advancements in audio processing and machine learning model technologies for model evolution on a regular basis.

Figure 3A:
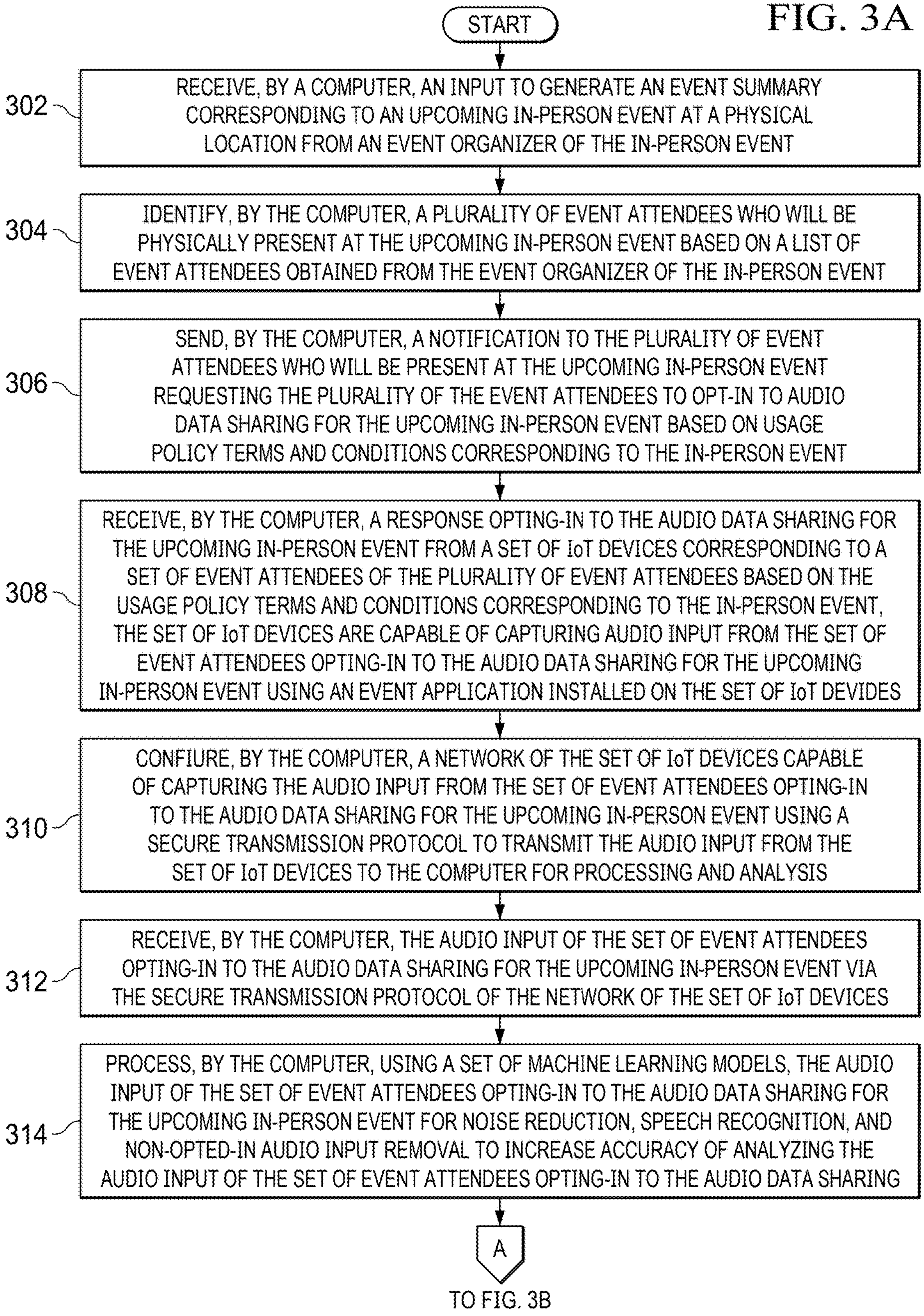
FIGS. 3A-3B are a flowchart illustrating a process for managing opt-in audio input in accordance with an illustrative embodiment.
Figure 3B:
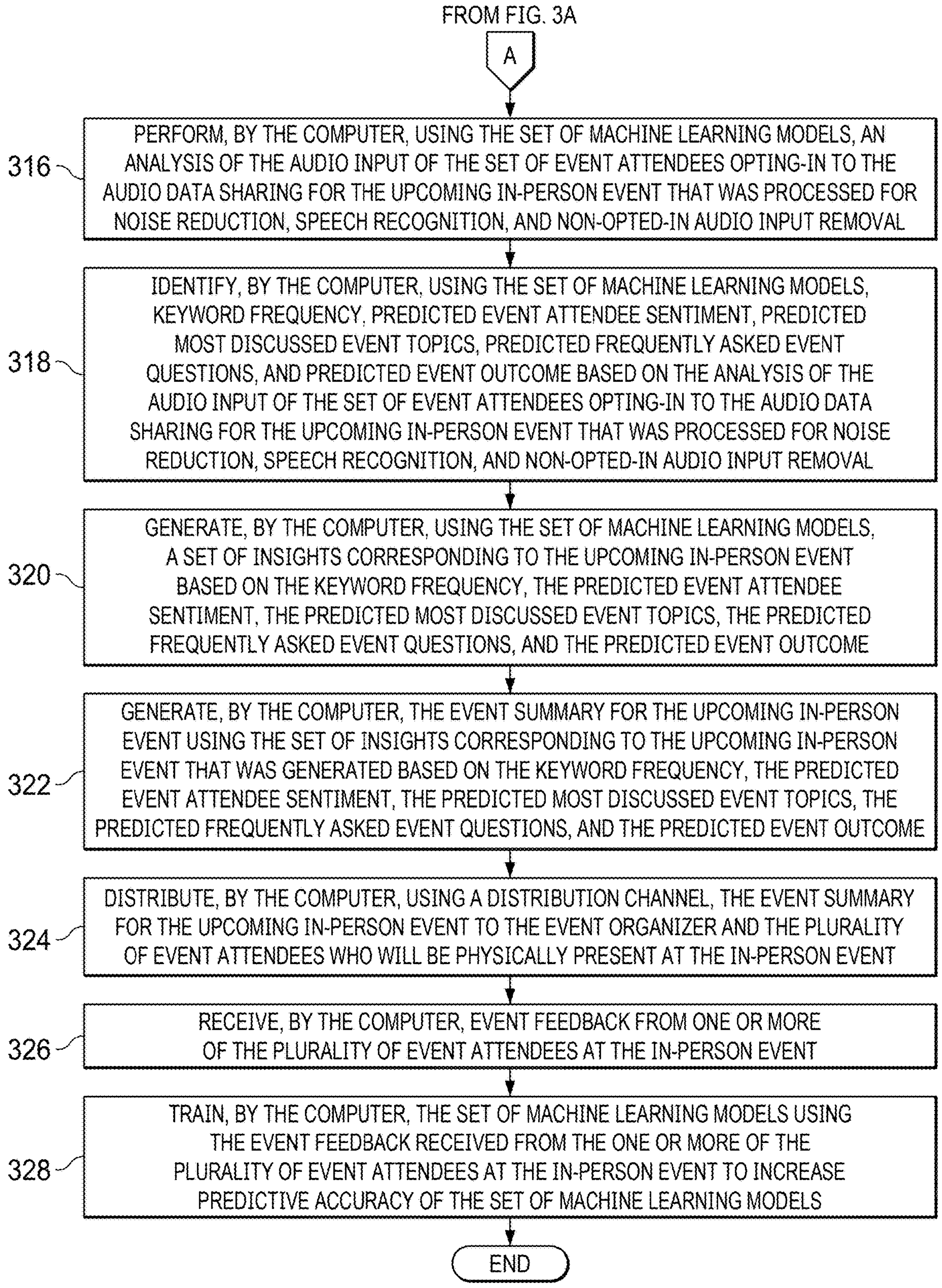

With reference now to FIGS. 3A-3B, a flowchart illustrating a process for managing opt-in audio input is shown in accordance with an illustrative embodiment. The process shown in FIGS. 3A-3B may be implemented in a computer, such as, for example, computer 101 in FIG. 1. For example, the process shown in FIGS. 3A-3B may be implemented by opt-in audio input management code 200 in FIG. 1.

The process begins when the computer receives an input to generate an event summary corresponding to an upcoming in-person event at a physical location from an event organizer of the in-person event (step 302). In response to receiving the input to generate the event summary, the computer identifies a plurality of event attendees who will be physically present at the upcoming in-person event based on a list of event attendees obtained from the event organizer of the in-person event (step 304).

The computer sends a notification to the plurality of event attendees who will be present at the upcoming in-person event requesting the plurality of event attendees to opt-in to audio data sharing for the upcoming in-person event based on usage policy terms and conditions corresponding to the in-person event (step 306). Subsequently, the computer receives a response opting-in to the audio data sharing for the upcoming in-person event from a set of IoT devices corresponding to a set of event attendees of the plurality of event attendees based on the usage policy terms and conditions corresponding to the in-person event (step 308). The set of IoT devices are capable of capturing audio input from the set of event attendees opting-in to the audio data sharing for the upcoming in-person event using an event application installed on the set of IoT devices.

The computer configures a network of the set of IoT devices capable of capturing the audio input from the set of event attendees opting-in to the audio data sharing for the upcoming in-person event using a secure transmission protocol to transmit the audio input from the set of IoT devices to the computer for processing and analysis (step 310). In response to configuring the network of the set of IoT devices, the computer receives the audio input of the set of event attendees opting-in to the audio data sharing for the upcoming in-person event via the secure transmission protocol of the network of the set of IoT devices (step 312).

The computer, using a set of machine learning models, processes the audio input of the set of event attendees opting-in to the audio data sharing for the upcoming in-person event for noise reduction, speech recognition, and non-opted-in audio input removal to increase accuracy of analyzing the audio input of the set of event attendees opting-in to the audio data sharing (step 314). The computer, using the set of machine learning models, performs an analysis of the audio input of the set of event attendees opting-in to the audio data sharing for the upcoming in-person event that was processed for noise reduction, speech recognition, and non-opted-in audio input removal (step 316).

The computer, using the set of machine learning models, identifies keyword frequency, predicted event attendee sentiment, predicted most discussed event topics, predicted frequently asked event questions, and predicted event outcome based on the analysis of the audio input of the set of event attendees opting-in to the audio data sharing for the upcoming in-person event that was processed for noise reduction, speech recognition, and non-opted-in audio input removal (step 318). The computer, using the set of machine learning models, generates a set of insights corresponding to the upcoming in-person event based on the keyword frequency, the predicted event attendee sentiment, the predicted most discussed event topics, the predicted frequently asked event questions, and the predicted event outcome (step 320).

Afterward, the computer generates the event summary for the upcoming in-person event using the set of insights corresponding to the upcoming in-person event that was generated based on the keyword frequency, the predicted event attendee sentiment, the predicted most discussed event topics, the predicted frequently asked event questions, and the predicted event outcome (step 322). The computer, using a distribution channel, distributes the event summary for the upcoming in-person event to the event organizer and the plurality of event attendees who will be physically present at the upcoming in-person event (step 324).

The computer receives event feedback from one or more of the plurality of event attendees at the in-person event (step 326). The in-person event is a same event as the upcoming in-person event. The computer trains the set of machine learning models using the event feedback received from the one or more of the plurality of event attendees at the in-person event to increase predictive accuracy of the set of machine learning models (step 328). Thereafter, the process terminates.

Thus, illustrative embodiments of the present disclosure provide a computer-implemented method, computer system, and computer program product for managing opt-in audio input. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

performing, using the set of machine learning models, an analysis of audio input of a set of event attendees opting-in to audio data sharing for the upcoming in-person event that was processed for noise reduction, speech recognition, and non-opted-in audio input removal;

identifying, using the set of machine learning models, keyword frequency, predicted event attendee sentiment, predicted most discussed event topics, predicted frequently asked event questions, and predicted event outcome based on the analysis of the audio input of the set of event attendees opting-in to the audio data sharing for an upcoming in-person event that was processed for noise reduction, speech recognition, and non-opted-in audio input removal;

generating, using a set of machine learning models, a set of insights corresponding to the upcoming in-person event based on the keyword frequency, the predicted event attendee sentiment, the predicted most discussed event topics, the predicted frequently asked event questions, and the predicted event outcome;

generating an event summary for the upcoming in-person event using the set of insights corresponding to the upcoming in-person event that was generated based on the keyword frequency, the predicted event attendee sentiment, the predicted most discussed event topics, the predicted frequently asked event questions, and the predicted event outcome; and distributing, using a distribution channel, the event summary for the upcoming in-person event to an event organizer and a plurality of event attendees who will be physically present at the in-person event.

2. The computer-implemented method of claim 1, further comprising:

receiving event feedback from one or more of the plurality of event attendees at the in-person event, wherein the in-person event is a same event as the upcoming in-person event; and training the set of machine learning models using the event feedback received from the one or more of the plurality of event attendees at the in-person event to increase predictive accuracy of the set of machine learning models.

3. The computer-implemented method of claim 1, further comprising:

receiving audio input of a set of event attendees opting-in to audio data sharing for the upcoming in-person event via a secure transmission protocol of a network of a set of Internet of Things (IoT) devices in response to configuring the network of the set of IoT devices; and processing, using the set of machine learning models, the audio input of the set of event attendees opting-in to the audio data sharing for the upcoming in-person event for noise reduction, speech recognition, and non-opted-in audio input removal to increase accuracy of analyzing the audio input of the set of event attendees opting-in to the audio data sharing.

4. The computer-implemented method of claim 1, further comprising:

configuring a network of a set of IoT devices capable of capturing audio input from a set of event attendees opting-in to audio data sharing for the upcoming in-person event using a secure transmission protocol to transmit the audio input from the set of IoT devices to a computer for processing and analysis.

5. The computer-implemented method of claim 1, further comprising:

sending a notification to the plurality of event attendees who will be present at the upcoming in-person event requesting the plurality of event attendees to opt-in to audio data sharing for the upcoming in-person event based on usage policy terms and conditions corresponding to the in-person event; and receiving a response opting-in to the audio data sharing for the upcoming in-person event from a set of IoT devices corresponding to a set of event attendees of the plurality of event attendees based on the usage policy terms and conditions corresponding to the in-person event, the set of IoT devices are capable of capturing audio input from the set of event attendees opting-in to the audio data sharing for the upcoming in-person event using an event application installed on the set of IoT devices.

6. The computer-implemented method of claim 1, further comprising:

receiving an input to generate the event summary corresponding to the upcoming in-person event at a physical location from the event organizer of the in-person event; and identifying the plurality of event attendees who will be physically present at the upcoming in-person event based on a list of event attendees obtained from the event organizer of the in-person event in response to receiving the input to generate the event summary.

7. The computer-implemented method of claim 1, wherein the event summary for the upcoming in-person event is customized for the set of event attendees based on event attendee profiles.

8. A computer system comprising:

a processor set;

one or more computer-readable storage media; and program instructions stored on the one or more computer-readable storage media to cause the processor set to perform operations comprising:

performing, using the set of machine learning models, an analysis of audio input of a set of event attendees opting-in to audio data sharing for an upcoming in-person event that was processed for noise reduction, speech recognition, and non-opted-in audio input removal;

identifying, using the set of machine learning models, keyword frequency, predicted event attendee sentiment, predicted most discussed event topics, predicted frequently asked event questions, and predicted event outcome based on the analysis of the audio input of the set of event attendees opting-in to the audio data sharing for the upcoming in-person event that was processed for noise reduction, speech recognition, and non-opted-in audio input removal;

generating, using a set of machine learning models, a set of insights corresponding to the upcoming in-person event based on the keyword frequency, the predicted event attendee sentiment, the predicted most discussed event topics, the predicted frequently asked event questions, and the predicted event outcome;

generating an event summary for the upcoming in-person event using the set of insights corresponding to the upcoming in-person event that was generated based on the keyword frequency, the predicted event attendee sentiment, the predicted most discussed event topics, the predicted frequently asked event questions, and the predicted event outcome; and distributing, using a distribution channel, the event summary for the upcoming in-person event to an event organizer and a plurality of event attendees who will be physically present at the in-person event.

9. The computer system of claim 8, wherein the operations further comprise:

receiving event feedback from one or more of the plurality of event attendees at the in-person event, wherein the in-person event is a same event as the upcoming in-person event; and training the set of machine learning models using the event feedback received from the one or more of the plurality of event attendees at the in-person event to increase predictive accuracy of the set of machine learning models.

10. The computer system of claim 8, wherein the operations further comprise:

receiving audio input of a set of event attendees opting-in to audio data sharing for the upcoming in-person event via a secure transmission protocol of a network of a set of Internet of Things (IoT) devices in response to configuring the network of the set of IoT devices; and processing, using the set of machine learning models, the audio input of the set of event attendees opting-in to the audio data sharing for the upcoming in-person event for noise reduction, speech recognition, and non-opted-in audio input removal to increase accuracy of analyzing the audio input of the set of event attendees opting-in to the audio data sharing.

11. The computer system of claim 8, wherein the operations further comprise:

configuring a network of a set of IoT devices capable of capturing audio input from a set of event attendees opting-in to audio data sharing for the upcoming in-person event using a secure transmission protocol to transmit the audio input from the set of IoT devices to the computer system for processing and analysis.

12. The computer system of claim 8, wherein the operations further comprise:

sending a notification to the plurality of event attendees who will be present at the upcoming in-person event requesting the plurality of event attendees to opt-in to audio data sharing for the upcoming in-person event based on usage policy terms and conditions corresponding to the in-person event; and receiving a response opting-in to the audio data sharing for the upcoming in-person event from a set of IoT devices corresponding to a set of event attendees of the plurality of event attendees based on the usage policy terms and conditions corresponding to the in-person event, the set of IoT devices are capable of capturing audio input from the set of event attendees opting-in to the audio data sharing for the upcoming in-person event using an event application installed on the set of IoT devices.

13. The computer system of claim 8, wherein the event summary for the upcoming in-person event is customized for the set of event attendees based on event attendee profiles.

14. A computer program product comprising:

one or more computer-readable storage media; and program instructions stored on the one or more computer-readable storage media to perform operations comprising:

performing, using the set of machine learning models, an analysis of audio input of a set of event attendees opting-in to audio data sharing for the upcoming in-person event that was processed for noise reduction, speech recognition, and non-opted-in audio input removal;

identifying, using the set of machine learning models, keyword frequency, predicted event attendee sentiment, predicted most discussed event topics, predicted frequently asked event questions, and predicted event outcome based on the analysis of the audio input of the set of event attendees opting-in to the audio data sharing for an upcoming in-person event that was processed for noise reduction, speech recognition, and non-opted-in audio input removal;

generating, using a set of machine learning models, a set of insights corresponding to the upcoming in-person event based on the keyword frequency, the predicted event attendee sentiment, the predicted most discussed event topics, the predicted frequently asked event questions, and the predicted event outcome;

generating an event summary for the upcoming in-person event using the set of insights corresponding to the upcoming in-person event that was generated based on the keyword frequency, the predicted event attendee sentiment, the predicted most discussed event topics, the predicted frequently asked event questions, and the predicted event outcome; and distributing, using a distribution channel, the event summary for the upcoming in-person event to an event organizer and a plurality of event attendees who will be physically present at the in-person event.

15. The computer program product of claim 14, wherein the operations further comprise:

receiving event feedback from one or more of the plurality of event attendees at the in-person event, wherein the in-person event is a same event as the upcoming in-person event; and training the set of machine learning models using the event feedback received from the one or more of the plurality of event attendees at the in-person event to increase predictive accuracy of the set of machine learning models.

16. The computer program product of claim 14, wherein the operations further comprise:

receiving audio input of a set of event attendees opting-in to audio data sharing for the upcoming in-person event via a secure transmission protocol of a network of a set of Internet of Things (IoT) devices in response to configuring the network of the set of IoT devices; and processing, using the set of machine learning models, the audio input of the set of event attendees opting-in to the audio data sharing for the upcoming in-person event for noise reduction, speech recognition, and non-opted-in audio input removal to increase accuracy of analyzing the audio input of the set of event attendees opting-in to the audio data sharing.

17. The computer program product of claim 14, wherein the operations further comprise:

configuring a network of a set of IoT devices capable of capturing audio input from a set of event attendees opting-in to audio data sharing for the upcoming in-person event using a secure transmission protocol to transmit the audio input from the set of IoT devices to a computer for processing and analysis.

18. The computer program product of claim 14, wherein the operations further comprise:

sending a notification to the plurality of event attendees who will be present at the upcoming in-person event requesting the plurality of event attendees to opt-in to audio data sharing for the upcoming in-person event based on usage policy terms and conditions corresponding to the in-person event; and receiving a response opting-in to the audio data sharing for the upcoming in-person event from a set of IoT devices corresponding to a set of event attendees of the plurality of event attendees based on the usage policy terms and conditions corresponding to the in-person event, the set of IoT devices are capable of capturing audio input from the set of event attendees opting-in to the audio data sharing for the upcoming in-person event using an event application installed on the set of IoT devices.

19. The computer program product of claim 14, wherein the operations further comprise:

receiving an input to generate the event summary corresponding to the upcoming in-person event at a physical location from the event organizer of the in-person event; and identifying the plurality of event attendees who will be physically present at the upcoming in-person event based on a list of event attendees obtained from the event organizer of the in-person event in response to receiving the input to generate the event summary.

20. The computer program product of claim 14, wherein the event summary for the upcoming in-person event is customized for the set of event attendees based on event attendee profiles.

* * * * *